(12) United States Patent
Bedu et al.

(10) Patent No.: US 8,178,233 B2
(45) Date of Patent: May 15, 2012

(54) CASE FOR MINIATURE FUEL CELLS

(75) Inventors: Yann Bedu, Fondettes (FR); Dominique Touzet, Savigne Sous le Lude (FR); Jean-Paul Farroni, Saint-Avertin (FR)

(73) Assignee: STMicroelectronics (Tours) SAS, Tours (FR)

( * ) Notice: Subject to any disclaimer, the term of this patent is extended or adjusted under 35 U.S.C. 154(b) by 634 days.

(21) Appl. No.: 12/354,312

(22) Filed: Jan. 15, 2009

(65) Prior Publication Data

US 2009/0186255 A1     Jul. 23, 2009

(30) Foreign Application Priority Data

Jan. 17, 2008 (FR) .................................... 08 50288

(51) Int. Cl.
*H01M 2/02* (2006.01)
(52) U.S. Cl. ........................................ 429/151; 429/452
(58) Field of Classification Search .......... 429/151–152, 429/452, 463–471
See application file for complete search history.

(56) References Cited

U.S. PATENT DOCUMENTS

| | | |
|---|---|---|
| 2004/0048132 A1 | 3/2004 | Takai et al. |
| 2006/0121328 A1 | 6/2006 | Liu et al. |
| 2006/0292435 A1 | 12/2006 | Liu et al. |
| 2007/0072040 A1 | 3/2007 | Kouassi et al. |

OTHER PUBLICATIONS

French Search Report dated Sep. 15, 2008 from French Patent Application No. 08/50288.

*Primary Examiner* — Thanhha Pham
(74) *Attorney, Agent, or Firm* — Wolf, Greenfield & Sacks, P.C.

(57) ABSTRACT

A case for fuel cells including an upper plate formed of a stack of a first insulating board, portions of a first conductive layer, a second insulating board, and a second conductive layer, this stack including windows, fuel cells being placed under the first insulating board at the level of the windows to obstruct them, the stack further comprising first openings filled with a heat-transmitting material forming a contact between the periphery of the fuel cells and the second conductive layer.

16 Claims, 4 Drawing Sheets

CASE FOR MINIATURE FUEL CELLS

CROSS REFERENCE TO RELATED APPLICATIONS

This application claims the priority benefit of French patent application Ser. No. 08/50288, filed on Jan. 17, 2008 entitled "CASE FOR MINIATURE FUEL CELLS," which is hereby incorporated by reference to the maximum extent allowable by law.

BACKGROUND OF THE INVENTION

1. Field of the Invention

The present invention relates to a case for miniature fuel cells, and more specifically to a case enabling dissipation of the heat generated by fuel cells.

2. Discussion of the Related Art

Miniature fuel cells especially aim at equipping portable electronic equipments such as computers, telephones, music readers, etc.

FIG. 1 shows an example of an integrated fuel cell formed by using microelectronics techniques. This cell is formed on a silicon wafer 1 coated with a first thin insulating layer 2 and with a second thicker insulating layer 3. An opening is formed in a portion of insulating layer 3. A stack of a support 4, a catalyst layer 5, an electrolyte 6, and a second catalyst layer 7 is located in this opening. This layer assembly forms the active stack of the fuel cell. An electrode 10 placed on first insulating layer 2 enables taking a contact on the lower surface of the fuel cell, on support 4. An opening 11 in second insulating layer 3 provides access to electrode 10. An upper electrode 12 enables taking a contact on upper catalyst layer 7. Electrodes 10 and 12 are provided with openings, and channels 13 are formed in silicon wafer 1 opposite to the openings in the lower surface metallization. Lower electrode 10 and upper electrode 12 respectively form an anode collector and a cathode collector.

Electrolyte 6 is, for example, a polymer acid such as Nafion in solid form and catalyst layers 5 and 7 for example are carbon and platinum based layers. This is an example of embodiment only. Various types of fuel cells that can be formed as illustrated in FIG. 1 are known in the art.

To operate the fuel cell, hydrogen is injected in the direction indicated by arrow H2 on the lower surface side and air (oxygen carrier) is injected on the upper surface side. The hydrogen is "broken down" at the level of catalyst layer 5 to form, on the one hand, H+ protons which move towards electrolyte 6 and, on the other hand, electrons which move towards the outside of the cell through anode collector 10. The H+ protons cross electrolyte 6 to join catalyst layer 7 where they recombine with oxygen, coming from outside of the cell through the cathode collector, and with electrons. In known fashion, with such a structure, a positive voltage is obtained on cathode collector 12 (oxygen side) and a negative voltage is obtained on anode collector 10 (hydrogen side).

It should be underlined that FIG. 1 is not to scale. In particular, silicon wafer 1 typically has a thickness on the order of from 250 to 700 µm while the active stack of layers 4 to 7 typically has a thickness on the order of from 30 to 50 µm.

A conventional fuel cell is formed of a large number of adjacent cells of the type shown in FIG. 1, generally several hundreds, which are properly connected.

Such fuel cells cannot be placed in conventional integrated circuit housings since one of their surfaces needs to be open towards an enclosure containing hydrogen and the other one of the surfaces needs to be exposed to the ambient air. Further, these cells generate heat and, on the side of the surface exposed to oxygen, humidity.

SUMMARY OF THE INVENTION

An embodiment aims at providing a simple case containing several fuel cells enabling carrying off the heat generated by the fuel cells.

Thus, an embodiment of the present invention provides a case for fuel cells comprising an upper plate formed of the stack of a first insulating board, of portions of a first conductive layer, of a second insulating board, and of a second conductive layer, this stack comprising windows, fuel cells being placed under the first insulating board at the level of the windows to obstruct them, the stack further comprising first openings filled with a heat-transmitting material forming a contact between the periphery of the fuel cells and the second conductive layer.

According to an embodiment, the first insulating board comprises second openings filled with a conductive material forming a contact between the terminals of the fuel cell and the portions of the first conductive layer, the portions of the first conductive layer being formed to connect together the terminals of the different fuel cells.

According to an embodiment, the second insulating board and the second conductive layer comprise second openings emerging on portions of the first conductive layer.

According to an embodiment, a surplus of heat-transmitting material is formed at the level of the first openings on the second conductive board.

According to an embodiment, the first and second insulating boards are printed circuit boards (PCB), the first and second conductive layers being formed on said printed circuit boards by insolation by means of a phototool, then by development, etching, and cleaning.

According to an embodiment, the first and second conductive layers are made of copper.

According to an embodiment, the portions of the first conductive layer stop before the contour of the first openings, the second insulating board deforming around said first openings and contacting the first insulating board.

According to an embodiment, the case further comprises a lower plate and lateral walls forming, with the upper plate, an enclosure.

The foregoing objects, features, and advantages of the present invention will be discussed in detail in the following non-limiting description of specific embodiments in connection with the accompanying drawings.

DETAILED DESCRIPTION

Figure 1:
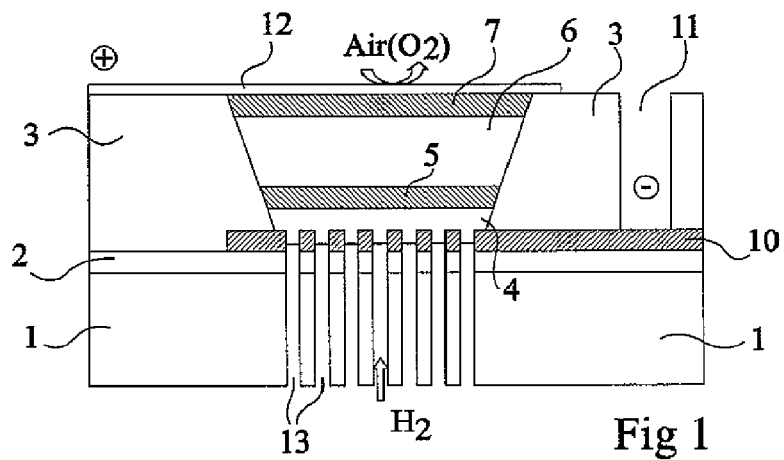
FIG. 1, previously-described, illustrates a known fuel cell.

For clarity, the same elements have been designated with the same reference numerals in the different drawings and, further, as usual in the representation of integrated components, the various drawings are not to scale.

Figure 2:
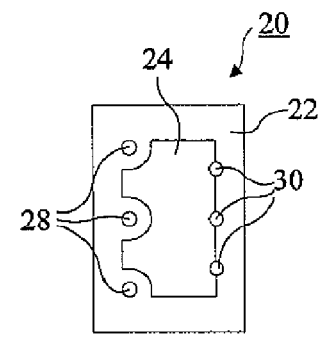
FIG. 2 is a top view of a fuel cell used in an embodiment.

FIG. 2 is a top view of a fuel cell 20 according to an embodiment. Fuel cell 20 is formed of a rectangular support 22 comprising an area 24 which contains fuel cells such as that illustrated in FIG. 1. An example in which the cell comprises three positive terminals and three negative terminals is here considered. It should be noted that this number is given as an example only. In top view, three terminals 28 (positive or negative) are formed at the periphery of area 24, on the left side thereof. The three other terminals (positive or negative) 30 are placed at the periphery of area 24, on the right side thereof.

Figure 3:
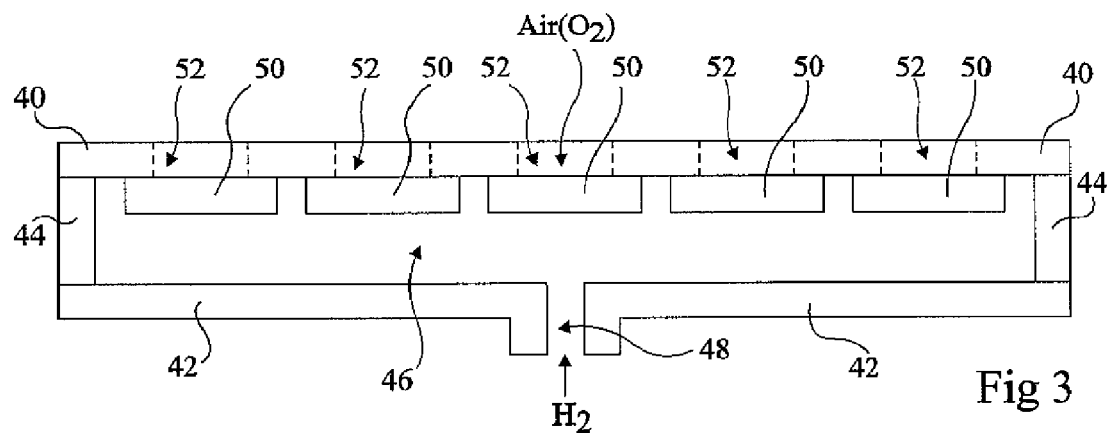
FIG. 3 is a simplified cross-section view of a fuel cell case according to an embodiment.

FIG. 3 illustrates a fuel cell case according to an embodiment. This case comprises an upper plate 40, a lower plate 42, and lateral walls 44 which define a closed enclosure 46. Enclosure 46 is supplied with hydrogen by means of an opening 48 formed in lower plate 42. Fuel cells 50 are assembled in enclosure 46 on upper surface 40. The lower surface of fuel cells 50 is thus in contact with the hydrogen present in enclosure 46. Openings 52 are formed in upper plate 40 at the level of each fuel cell 50 to enable an oxygen supply on the upper surfaces of fuel cells 50.

The forming of upper plate 40 and the assembly of fuel cells on this plate will here be considered. The structures of plate 42 and of walls 44 are here given as an example, and any other shape providing a hydrogen-supplied enclosure 46 would be appropriate. For example, wall 44 and lower plate 42 may form one piece. Similarly, plate 40 may comprise edges forming walls 44.

FIGS. 4A to 4D, 5A and 5B, and 6A and 6B illustrate steps of a method for manufacturing an upper plate of a fuel cell case according to an embodiment.

Figure 4A:
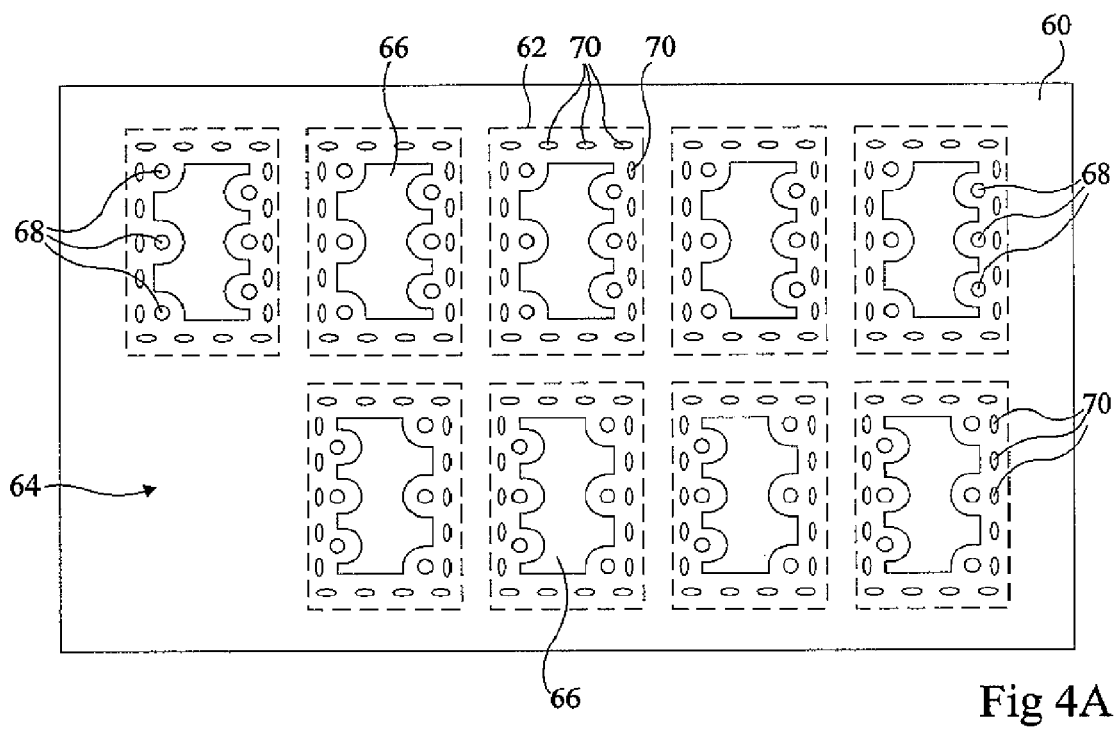
FIGS. 4A to 4D are top views illustrating steps of the forming of the upper plate of a case according to an embodiment.

As illustrated in FIG. 4A, it is started from a first board 60 comprising nine locations 62 delimited by dotted lines, each of which is intended to receive a fuel cell 50 of the type illustrated in FIG. 2. The locations are distributed over two lines, one of five locations and one of four locations A free location 64 is provided on the board, next to the line comprising four locations, to receive connection terminals and/or to contain a cell management circuit. In FIG. 4A, free location 64 is shown as being to the bottom left of plate 60. It should however be noted that the number of shown locations and the position of free location 64 are examples only. The present embodiment applies to a case containing a greater or smaller number of locations, where free location 64 can be located anywhere on board 60.

Board 60 is, for example, a printed circuit board (PCB) of rectangular shape. It comprises, within each location 62, a window 66. Each window 66 has a shape substantially identical to area 24 of the fuel cell illustrated in FIG. 2. Around each window 66, at the locations of terminals 28 and 30 (FIG. 2) of the fuel cell, circular openings 68 are formed. In each location 62 delimited by the dotted lines, and along these dotted lines, many openings 70, for example, oblong, are formed. In FIG. 4A, 18 oblong openings distributed around each window 66 have been formed. It should be noted that the number and the shape of openings 70 are here given as an example only.

Figure 4B:
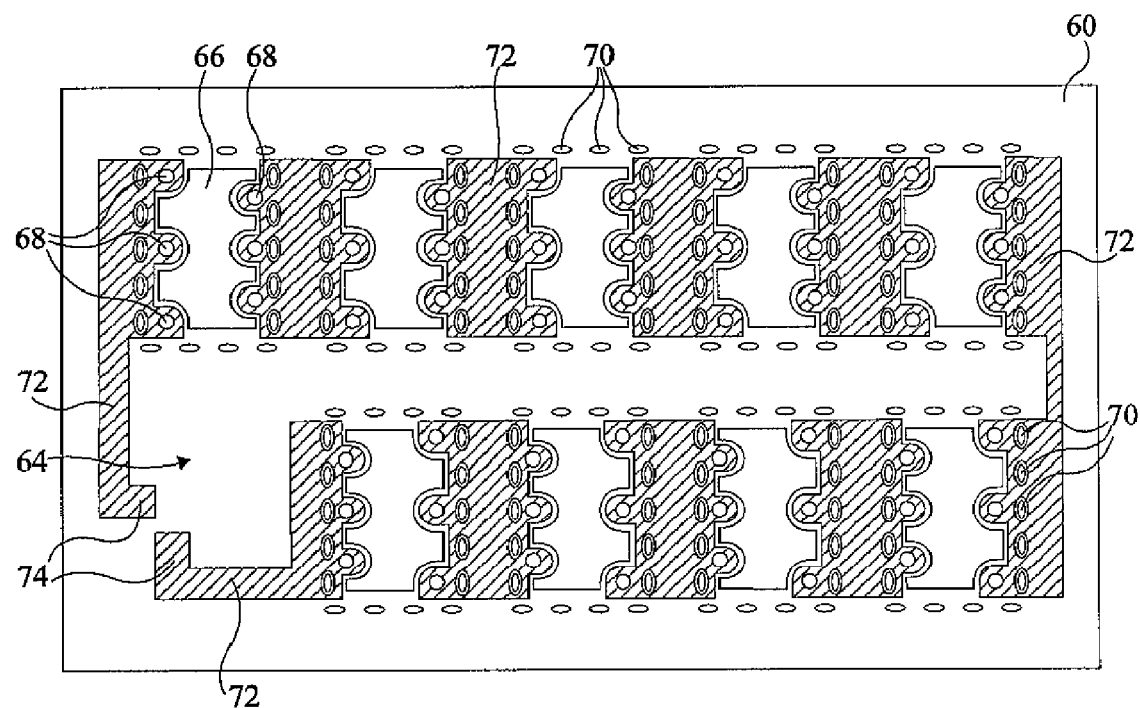

FIG. 4B illustrates the structure opened after having formed a metal circuit formed of several metal portions 72 on board 60. Portions 72 may be made of copper and formed by conventional printed circuit techniques (for example, by insolation by means of a phototool, development, etching, and cleaning). Portions 72 aim at connecting the fuel cells together in adapted fashion. It is here considered that the terminals located on a same side of a cell are at the same voltage and, in this example, that the fuel cells are series-connected. Between two windows 66 located side by side, copper portion 72 covers the entire area located between the windows, preferably surrounds the upper edges of openings 68, and may stop slightly before the contour of windows 66. Two copper portions 72 edge the right-hand contours of windows 66 located to the right of board 60 and a copper track connects the two copper portions. The connection of the fuel cells located at the ends of the series circuit is performed by two copper portions 72 which edge the left-hand portions of windows 66 and by a copper track which connects these portions to two terminals 74 provided in free location 64. Terminals 74 enable connection of all the tracks to the outside. Copper portions 72 surround openings 70 but preferably stop little before the edge of openings 70.

Figure 4C:
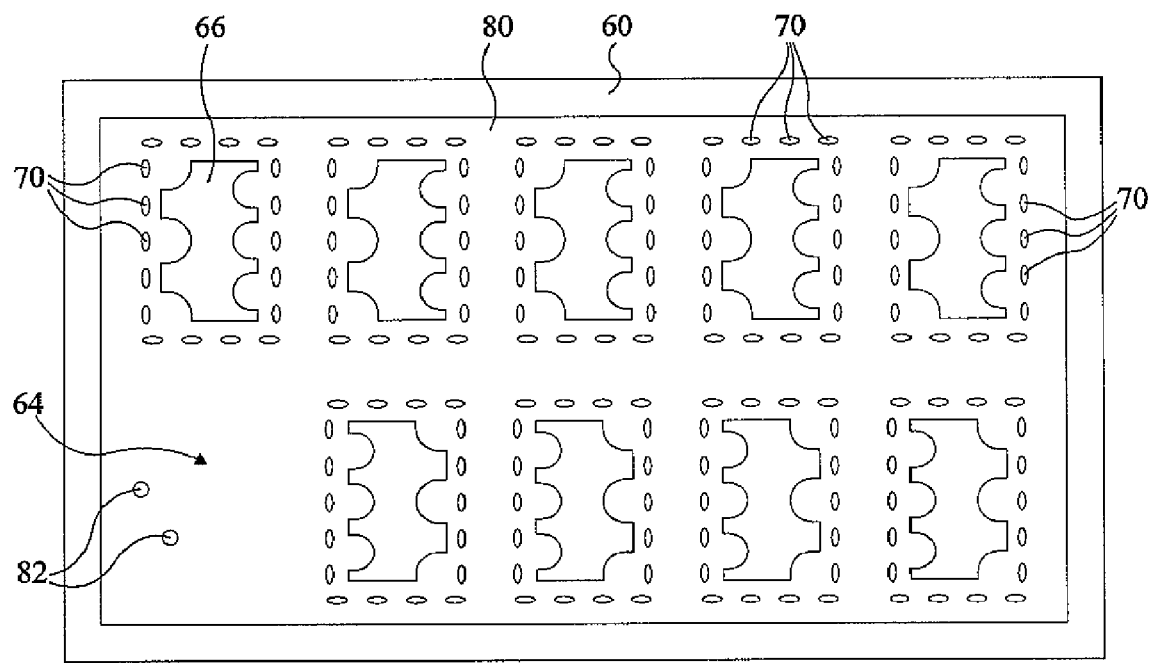

FIG. 4C is a top view illustrating the structure obtained after having deposited a second rectangular PCB 80 on the structure of FIG. 4B. Second PCB 80 comprises windows 66 and openings 70 identical to those of first PCB 60. It is placed on board 60 so that openings 70 and the windows 66 superpose. In FIG. 4C, board 80 is shown as being smaller than board 60, but board 80 will preferably have the same size as board 60. In free location 64, two openings 82 are formed at the level of terminals 74 for connection, for example, to an external circuit.

Figure 4D:
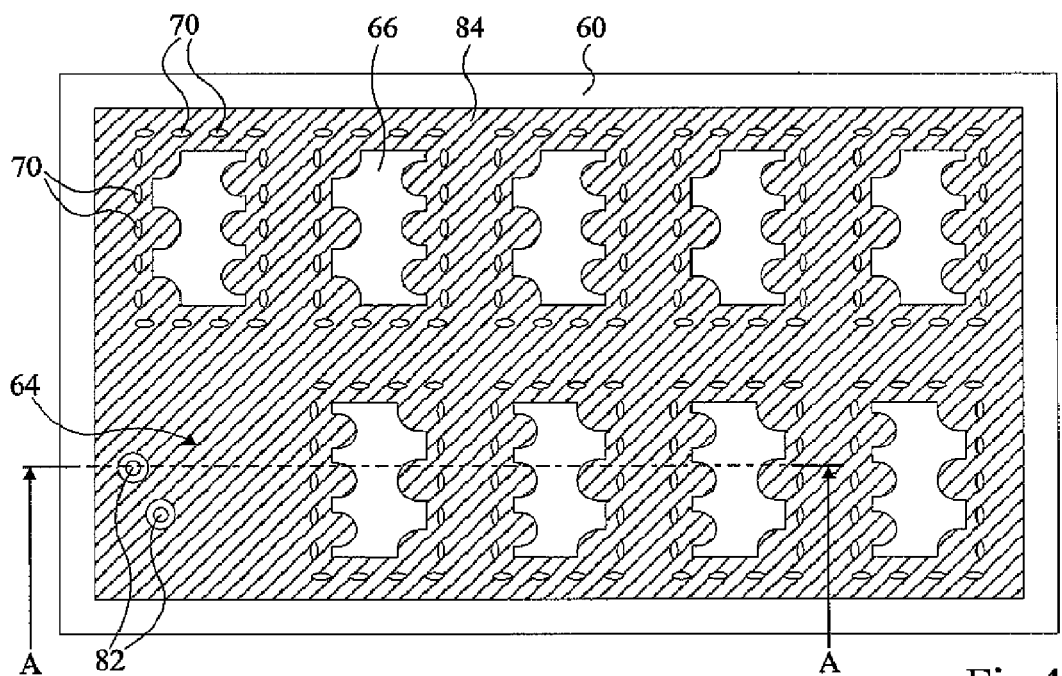

FIG. 4D illustrates the structure obtained after having formed a uniform metal layer 84 on PCB 80. Metal layer 84 may be made of copper. It entirely covers PCB 80, except a clearance around openings 82. This enables taking a contact on terminals 74 by avoiding a short-circuit with copper layer 84. The contacts on terminals 74 in openings 82 may as an example be formed by injecting a conductive material into openings 82 so that the conductive material is in contact with copper terminals 74.

Figure 5A:
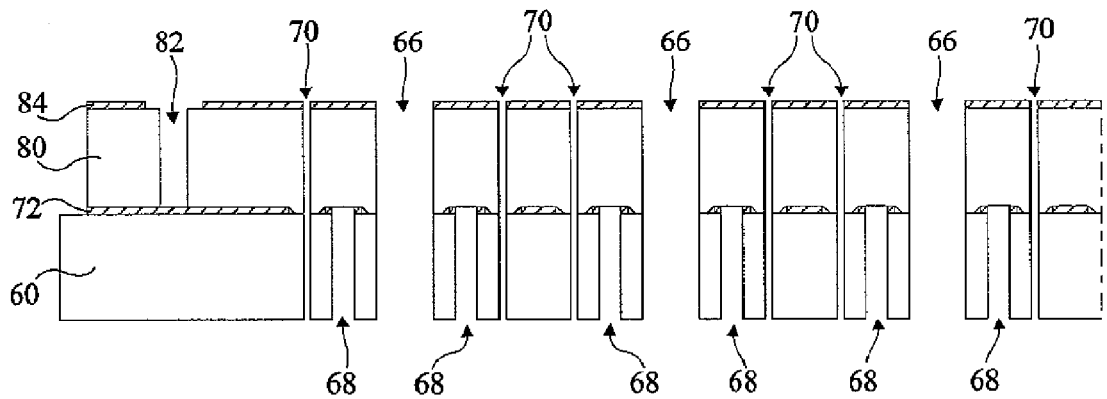
FIGS. 5A and 5B are side cross-section views of the structure of FIG. 4D along line A-A, FIG. 5B being an enlargement of the central portion of FIG. 5A.
Figure 5B:
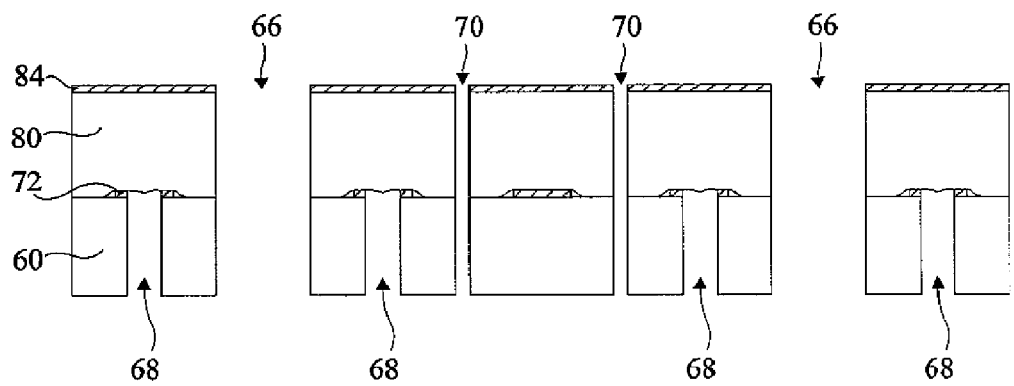

FIGS. 5A and 5B are cross-section views of the structure of FIG. 4D along a line A-A which runs through one of openings 82 and through windows 66. FIG. 5B is an enlargement of the central portion of FIG. 5A. These drawings illustrate the stack of two PCBs 60 and 80, the position of copper portions 72 and 84, as well as the position of windows 66 and of openings 68, 70, and 82. Windows 66 and opening 70 extend across the entire stack, while openings 68 are formed in first PCB 60 only and openings 82 are formed in second PCB 80 only. Since copper portions 72 do not reach the contour of openings 70, second PCB 80 slightly collapses around openings 70 to come into contact with first PCB 60. This enables avoiding any contact between copper portions 72 and the material which will be placed in openings 70. Similarly, but non limitingly, copper portions 72 may stop slightly before windows 66. Second PCB 80 thus also collapses around windows 66 to contact first PCB 60.

FIG. 5B is an enlargement of the central portion of FIG. 5A, better showing the collapsing of second PCB 80 on first PCB 60.

Figure 6A:
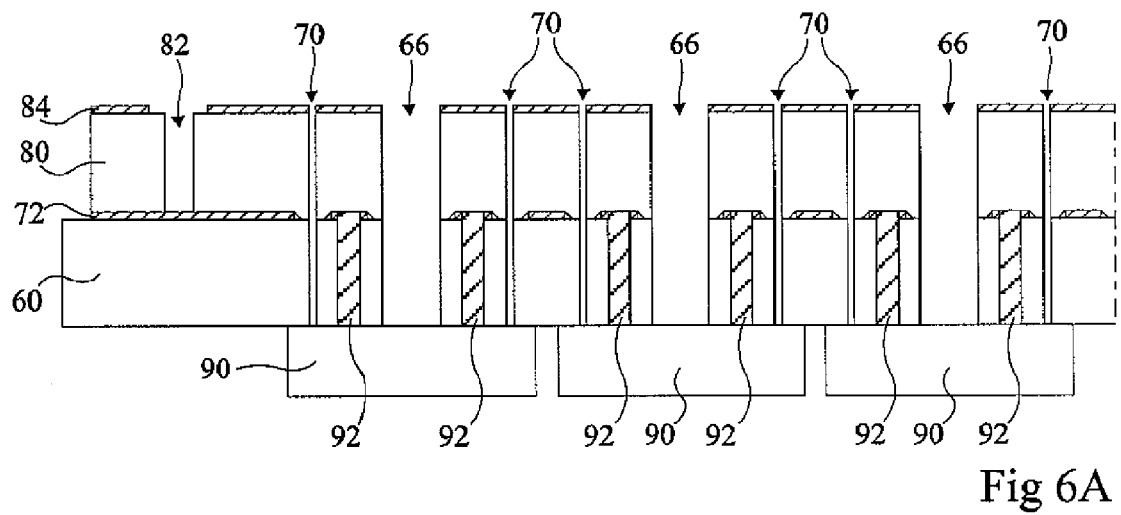
FIGS. 6A and 6B are cross-section views illustrating the structure of FIG. 5A at subsequent steps of the forming of the upper plate of the case according to an embodiment.
Figure 6B:
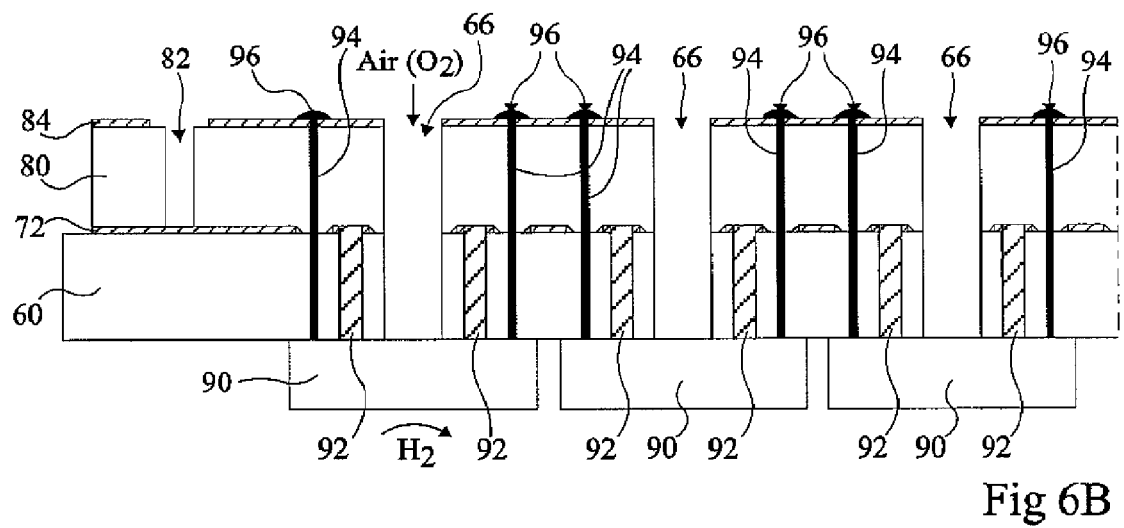

FIGS. 6A and 6B are cross-section views illustrating the structure of FIG. 5A at subsequent steps of the forming of the upper plate of the case according to an embodiment.

The structure of FIG. 6A is obtained from the structure of FIG. 5A and from nine fuel cells 90 such as that illustrated in FIG. 2. A conductive glue 92 is deposited on each of terminals 28 and 30 of the fuel cells. Fuel cells 90 are then glued under the stack of FIG. 4D and glue 92 penetrates into openings 68 to contact copper portions 72. Known gluing methods enable depositing enough glue to ensure a good contact with copper portions 72, while avoiding for the glue to bleed on the active cell portions. A series connection of the different fuel cells 90 is thus obtained.

At the step illustrated in FIG. 6B, a glue 94 is injected into openings 70 to connect non-active portions of fuel cells 90 to copper layer 84. Glue 94 is a heat-transmitting glue which is as electrically insulating as possible. Glue 94 is deposited by a sufficient amount to fill openings 70 and form a glue surplus 96 above copper layer 80, this surplus providing a good thermal contact on copper layer 84. Part of glue 94 also leaks between first PCB 60 and fuel cells 90, around openings 70, which provides a continuous seal and thus a good tightness between the two surfaces of fuel cells 90. In the case where glue 94 is not totally electrically insulating, the collapse of second PCB 80 around openings 70 is indispensable. Indeed, such a collapse enables avoiding any contact between copper portions 72 and heat-transmitting glue 94. On the contrary, if glue 94 is totally electrically insulating, the collapse of second PCB 80 around openings 70 becomes optional. Indeed, in this case, copper portions 72 may extend to openings 70 and touch glue 94 without causing any short-circuit.

An upper plate of a fuel cell case is thus obtained, which comprises:
- the oxygen supply of fuel cells 90 by openings 66;
- the series connection of different fuel cells 90 via copper tracks 72 and conductive glue 92;
- the dissipation of the heat generated by the fuel cells due to heat-transmitting glue 94 and to copper layer 84, which behaves as a heat sink; and
- the tightness of the structure, between the upper and lower surfaces of fuel cells 90, due to heat-transmitting glue 94.

Windows 66 and openings 70 may be formed after achieving the stack of the two PCBs 60 and 80. Openings 68 and 82 are, as for them, formed before assembly of two PCBs 60 and 80.

As an example, board 60 may have a length ranging between 3 and 5 cm and a width ranging between 2 and 3 cm. Openings 66 may have a width ranging between 0.7 and 1.2 cm and a length ranging between 0.3 and 0.7 cm. Openings 68, 70, and 82 may have dimensions ranging between 0.5 and 2 mm.

Specific embodiments of the present invention have been described. Various alterations and modifications will occur to those skilled in the art. In particular, by modifying the structure of copper portions 72, it is possible to connect the different fuel cells other than in series, if desired.

As a variation, openings identical to openings 82 may be formed in second PCB 80 and in copper layer 84 at the level of certain copper portions 72. These openings, filled with a conductive material, enable forming test contacts between the different fuel cells to verify the proper operation of each cell. As an example, these additional openings may be formed above openings 68.

An embodiment of the upper plate of the fuel cell case formed of the stack of two PCBs on which copper portions are formed has been described herein. The fuel cell case of FIG. 6B may also be obtained by using any method for forming a stack of insulating/conductive/insulating/conductive materials. Successive depositions of conductive, insulating, and conductive layers may also be carried out.

Of course, the present invention is likely to have various alterations, modifications and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A case for fuel cells, the fuel cells comprising an active central zone and an inactive periphery, the case comprising:
    an upper plate formed of a stack that comprises a first insulating board, portions of a first conductive layer, a second insulating board, and a second conductive layer, the stack comprising windows arranged to be obstructed, on a side that faces the first insulating board by the active central zones of the fuel cells, the stack further comprising first openings distributed about a periphery of the windows and filled with a heat-transmitting material contacting the second conductive layer, the heat-transmitting material being insulating to the transfer of electrical energy.

2. The case of claim 1, wherein the first insulating board comprises second openings filled with a conductive material adapted to form a contact between electrical terminals of the fuel cell and the portions of the first conductive layer.

3. The case of claim 1, wherein the second insulating board and the second conductive layer comprise second openings emerging on portions of the first conductive layer.

4. The case of claim 1, wherein a surplus of heat-transmitting material is formed at the level of the first openings on the second conductive layer.

5. The case of claim 1, wherein the first and second insulating boards are printed circuit boards, the first and second conductive layers being formed on said printed circuit boards by insolation by means of a phototool, then by development, etching, and cleaning.

6. The case of claim 1 wherein the first and second conductive layers are made of copper.

7. The case of claim 1, wherein the portions of the first conductive layer stop before a contour of the first openings, the second insulating board deforming around said first openings and contacting the first insulating layer.

8. The case of claim 1, further comprising a lower plate and lateral walls forming, with the upper plate, an enclosure.

9. The case of claim 1, in combination with the fuel cells.

10. A case for fuel cells, comprising:
    a stack of materials that includes, arranged in order from a first surface to a second surface of the stack, a first insulating board, a first conductive layer, a second insulating board, and a second conductive layer,
    a plurality of windows that extend through the stack from the first surface to the second surface, the plurality of windows sized to be obstructed by central active areas of fuel cells;
    a plurality of first passageways that extend through the stack from the first surface to the second surface, the plurality of passageways including a heat-transmitting material that is insulating to the transfer of electrical energy.

11. The case of claim 10, further comprising:
    a second plurality of passageways that extend from the first surface to the first conductive layer and that include an electrically conductive material, the second plurality of passageways in electrical contact between and providing an electrical path between electrical terminals of fuel cells and the first conductive layer.

12. The case of claim 11, wherein the first insulating board and the second insulating board contact one another about a periphery of each of the plurality of first passageways to provide isolation between each of the plurality of first passageways and the second conductive layer.

13. The case of claim 12, wherein the first insulating board and the second insulating board contact one another about a periphery of each of the plurality of windows to provide isolation between each of the plurality of windows and the second conductive layer.

14. The case of claim 12, in combination with a plurality of fuel cells, each of the plurality of fuel cells mounted to the first insulating board and obstructing a corresponding window and each of the plurality of first passageways in thermal contact with fuel cells.

15. The case of claim 10, wherein the first and second insulating boards are printed circuit boards, the first and second conductive layers being formed on said printed circuit boards by insolation by means of a phototool, then by development, etching, and cleaning.

16. The case of claim 15, wherein the first and second conductive layers are made of copper.

* * * * *